United States Patent
Spiegel et al.

(10) Patent No.: US 8,235,013 B2
(45) Date of Patent: Aug. 7, 2012

(54) INTERNAL COMBUSTION ENGINE

(75) Inventors: Leo Spiegel, Vaihingen/Enz (DE);
Van-Khanh Tran, Weissach (DE);
Hartmut Voss, Wimsheim (DE);
Dietmar Schwarzenthal, Ditzingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 255 days.

(21) Appl. No.: 12/708,075

(22) Filed: Feb. 18, 2010

(65) Prior Publication Data

US 2010/0236238 A1    Sep. 23, 2010

Related U.S. Application Data

(60) Provisional application No. 61/175,152, filed on May 4, 2009.

(30) Foreign Application Priority Data

Mar. 23, 2009 (DE) .................... 10 2009 014 087

(51) Int. Cl.
*F01L 1/34* (2006.01)
(52) U.S. Cl. .................. 123/90.15; 123/90.17
(58) Field of Classification Search ............ 123/90.11, 123/90.15, 90.16, 90.17, 559.1, 320, 321, 123/345–348; 60/322–324, 605.1, 602, 299
See application file for complete search history.

(56) References Cited

U.S. PATENT DOCUMENTS

| | | | |
|---|---|---|---|
| 6,105,550 A | 8/2000 | Nieberding | |
| 6,192,858 B1 | 2/2001 | Nieberding | |
| 6,321,731 B1 * | 11/2001 | Russ et al. | ............ 123/568.14 |
| 6,651,616 B1 | 11/2003 | Juretzka | |
| 7,013,867 B2 * | 3/2006 | Rammer et al. | ............... 123/321 |
| 7,252,054 B2 * | 8/2007 | Weber et al. | ............... 123/90.15 |
| 7,258,100 B2 * | 8/2007 | Pinkston | ............... 123/316 |
| 7,363,890 B2 * | 4/2008 | Baeuerle | ............... 123/90.15 |
| 7,770,393 B2 * | 8/2010 | Buckland et al. | ............ 60/605.1 |

(Continued)

FOREIGN PATENT DOCUMENTS

DE        198 18 596 A1     11/1999

(Continued)

OTHER PUBLICATIONS

German Search Report issued on Jun. 30, 2011, in related Application No. DE 10 2009 014 087.5 (with partial English translation).

(Continued)

*Primary Examiner* — Hai Huynh
(74) *Attorney, Agent, or Firm* — RatnerPrestia (57) ABSTRACT

An internal combustion engine with a plurality of cylinders, which are each assigned an inlet valve, an outlet valve and a combustion space, with an inlet camshaft connected to a camshaft adjuster, with an outlet camshaft connected to a camshaft adjuster, with a switchable inlet-valve drive which has a plurality of inlet cams for actuating the respective inlet valve, with a switchable outlet-valve drive which has a plurality of outlet cams for actuating the respective outlet valve, and with an exhaust-gas system. The internal combustion engine is operated with compression ignition or with spark ignition as a function of the operating point. For this purpose, for the compression ignition, a specific residual exhaust-gas quantity is set in the combustion space. Furthermore, the internal combustion engine is operated as a function of the operating point by means of an outlet cam.

15 Claims, 12 Drawing Sheets

U.S. PATENT DOCUMENTS

| | | | |
|---|---|---|---|
| 7,801,665 B2* | 9/2010 | Buckland et al. | 701/103 |
| 8,036,806 B2* | 10/2011 | Nakamura | 701/102 |
| 2001/0032465 A1 | 10/2001 | Terry | |
| 2006/0016420 A1 | 1/2006 | Kuo | |
| 2006/0016438 A1 | 1/2006 | Kang | |
| 2006/0201489 A1 | 9/2006 | Brachert | |
| 2006/0219212 A1 | 10/2006 | Brachert | |
| 2008/0071462 A1* | 3/2008 | Christ et al. | 701/101 |
| 2009/0018756 A1* | 1/2009 | Storhok et al. | 701/105 |
| 2009/0050119 A1* | 2/2009 | Inoue | 123/564 |
| 2011/0000448 A1* | 1/2011 | Buckland et al. | 123/90.15 |
| 2011/0289902 A1* | 12/2011 | Reeves et al. | 60/274 |

FOREIGN PATENT DOCUMENTS

| | | |
|---|---|---|
| DE | 19852552 | 5/2000 |
| DE | 19923413 | 11/2000 |
| DE | 19944534 | 3/2001 |
| DE | 10348138 | 5/2005 |
| DE | 10348139 | 5/2005 |
| DE | 60114987 | 7/2006 |
| DE | 112005001819 | 5/2007 |
| DE | 112005001662 | 7/2008 |
| EP | 0798451 | 10/1997 |
| JP | 11264319 A | 9/1999 |
| JP | 2001107759 A | 4/2001 |
| JP | 2006266237 A | 10/2006 |

OTHER PUBLICATIONS

Japanese Non-Final Office Action of Japanese Patent Application No. 2010-065540, dated Jan. 13, 2012, with English translation.

* cited by examiner

INTERNAL COMBUSTION ENGINE

CROSS REFERENCE TO RELATED APPLICATIONS

This U.S. application claims priority to German Application No. DE 10 2009 014 087.5, filed on Mar. 23, 2009 and U.S. Provisional Application No. 61/175,152 filed on May 4, 2009 which are incorporated by reference herein in their entirety.

FIELD OF THE INVENTION

The invention relates to an internal combustion engine having a plurality of cylinders and to a method for operating such an internal combustion engine.

BACKGROUND OF THE INVENTION

DE 198 18 596 C5 discloses a method for operating a petrol engine, by means of which operation of the petrol engine with compression ignition in a part-load range is regulated. In this case, in a compression-ignition mode, a specific exhaust-gas quantity is retained in the combustion space and compressed, a fuel quantity being injected into the compressed exhaust-gas quantity before a supply of fresh air is started. In this case, the retained exhaust-gas quantity is regulated with the aid of an exhaust-gas retention flap.

SUMMARY OF THE INVENTION

An object on which the invention is based is to provide an internal combustion engine with improved combustion, which is operated with compression ignition or with spark ignition as a function of the operating point.

The internal combustion engine according to aspects of the invention is distinguished in that the outlet-valve drive is designed in such a way that a plurality of cams are selectively provided for actuating the respective outlet valve, at least one outlet cam having a plurality of cam elevations for setting a plurality of outlet opening phases. Consequently, an exhaust-gas quantity retained in the combustion space of the internal combustion engine can be controlled in such a way that an optimized combustion sequence is achieved particularly when the internal combustion engine is in the compression-ignition mode. Furthermore, by means of the internal combustion engine according to the invention, a broadening of the compression-ignition mode to further operating points can be achieved, so that an extended operational characteristic map with auto-ignition is obtained. Preferably, the internal combustion engine is designed as a petrol engine in which the fuel used is petrol.

According to further refinement of the invention, the outlet cam for setting a plurality of outlet opening phases is designed as a double cam. By an outlet-side double cam being used, according to aspects of the invention the inlet valves and the outlet valves can be controlled during a compression-ignition mode in such a way that a specific exhaust-gas quantity is sucked out of the exhaust-gas system back into the combustion space. By a switchable inlet-valve drive being used and by a switchable outlet-valve drive being used, both the inlet valves and the outlet valves are operated with different control times and different valve lifts, depending on the operating point of the internal combustion engine, so that a necessary exhaust-gas quantity is set in the combustion space of the internal combustion engine for the respective operating point.

According to a refinement of the invention, the exhaust-gas back-pressure adjustment device is designed as a continuously controlled exhaust-gas flap and is positioned, downstream of an exhaust-gas catalytic converter, in the exhaust-gas system. The positioning according to aspects of the invention of the exhaust-gas flap leads to the setting of a uniform exhaust-gas back-pressure within an exhaust manifold, so that the setting of an exhaust-gas quantity, necessary for the respective operating point, in the combustion space can be predicted.

According to an advantageous refinement of the invention, the exhaust-gas flap is positioned, upstream of an inlet into an exhaust-gas turbine, in the exhaust-gas system. Particularly when an exhaust-gas turbocharger is used, the positioning of the exhaust-gas flap takes place upstream of the exhaust-gas turbine inlet. Consequently, a reliable setting of a uniform exhaust-gas back-pressure in the exhaust manifold of the internal combustion engine is carried out. Alternatively, the exhaust-gas back-pressure adjustment device is designed as an integral part of an exhaust-gas turbocharger, the setting of the exhaust-gas back-pressure possibly being carried out with the aid of a variable turbine geometry of an exhaust-gas turbocharger. The exhaust-gas flap may therefore be dispensed with.

According to a further refinement of the invention, a first outlet opening phase and a second outlet opening phase can be set, the second outlet opening phase commencing during an inlet opening phase. Accordingly, during a combustion cycle, after an expulsion stroke a specific fresh-air quantity is first supplied to the combustion space during an inlet opening phase, the outlet valve being opened again during the inlet opening phase, so that a specific exhaust-gas quantity is sucked back into the combustion space. As a result of the exhaust-gas quantity being sucked back, a homogenization of the mixture is achieved, so that an advantageous auto-ignition of the mixture takes place. Furthermore, an extension of the compression-ignition operation to wide ranges of the characteristic map of the internal combustion engine can be achieved.

According to an advantageous refinement of the invention, the outlet-valve drive has a sliding-cam device. Such a sliding-cam device makes it possible to arrange different cams on the outlet side, so that a rapid changeover from compression-ignition operation to spark-ignition operation, depending on the operating point of the internal combustion engine, is made possible. Preferably, the inlet-valve drive likewise has a sliding-cam device, by means of which a rapid and reliable changeover from a compression-ignition mode to a spark-ignition mode of the internal combustion engine is likewise achieved.

According to aspects of the invention, the outlet-side sliding-cam device has at least one double cam for the setting of two outlet opening phases. Preferably, the outlet-side sliding-cam device is designed in such a way that three cams are provided per valve on the outlet side. The respective valve can thereby be actuated by one of the three cams. The selection of the respective cam takes place as a function of the operating point. For the setting of two outlet opening phases, at least one of these cams is provided with the double cam, by means of which a twofold opening of the outlet valve is made possible. As a result, during an inlet opening phase, a specific exhaust-gas quantity can be sucked out of the exhaust-gas system back into the combustion space of the internal combustion engine.

According to a further aspect of the invention, a method for operating an internal combustion engine is provided. Accordingly, the internal combustion engine is operated in the compression-ignition mode by means of an outlet cam, by means of which a first outlet opening phase and a second outlet opening phase take place, the second outlet opening phase commencing during an inlet opening phase, and, at a first operating point of the compression-ignition mode, the residual exhaust-gas quantity in the combustion space being dimensioned as a function of a valve interference set between the inlet and the outlet valve during a charge exchange, and, at a second operating point of the compression-ignition mode, the residual exhaust-gas quantity in the combustion space being dimensioned as a function of a duration of the second outlet opening phase. As a result, an extension of compression-ignition operation to wide ranges of the characteristic map of the internal combustion engine can be achieved. Preferably, the internal combustion engine is operated with spark ignition during a changeover from the first operating point to the second operating point, and vice versa.

According to an advantageous refinement of the invention, the residual exhaust-gas quantity in the combustion space is dimensioned as a function of the position of the exhaust-gas back-pressure adjustment device. An exact setting of the exhaust-gas quantity, necessary for the respective operating point, in the combustion space consequently takes place.

BRIEF DESCRIPTION OF THE DRAWINGS

It would be appreciated that the features mentioned above and those yet to be explained below can be used not only in the combination specified in each case, but also in other combinations or alone, without departing from the scope of the present invention. Further features of the invention may be gathered from the subsequent description and the drawing in which.

DETAILED DESCRIPTION OF THE DRAWINGS

Figure 1:
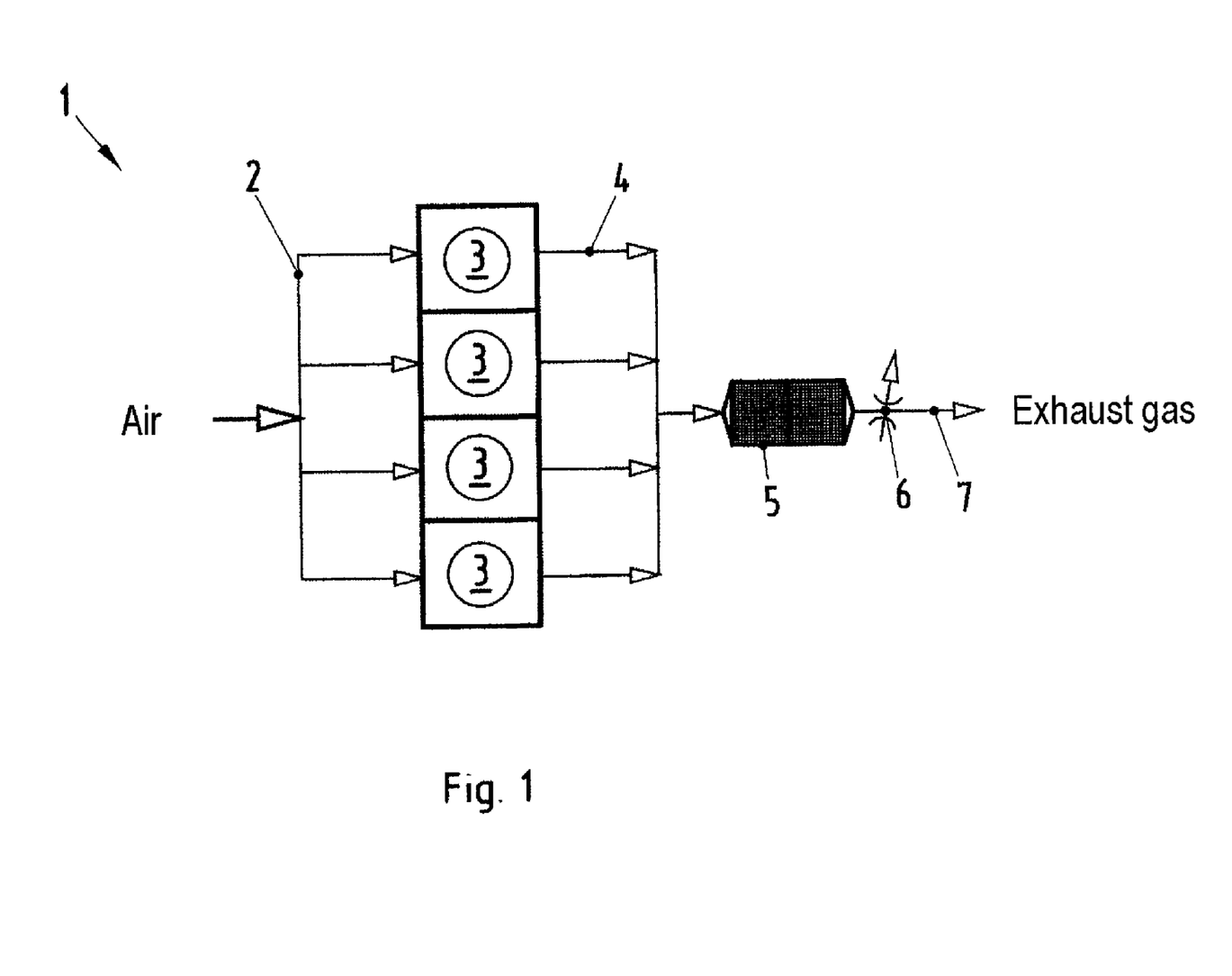
FIG. 1 shows a diagrammatic image of an internal combustion engine according to a first exemplary embodiment.

FIG. 1 illustrates diagrammatically an internal combustion engine 1 which comprises a suction system 2, a plurality of cylinders 3, an exhaust manifold 4, an exhaust-gas catalytic converter 5, an exhaust-gas back-pressure adjustment device designed as an exhaust-gas flap 6, and an exhaust line 7. Guided in each cylinder 3 of the internal combustion engine 1 is a piston, not illustrated, which is held longitudinally displaceably and between which and a cylinder head, not illustrated, a combustion space is formed. The combustion space of the internal combustion engine 1 is closed off upwards by the cylinder head, the piston delimiting the combustion space downwards. The internal combustion engine 1 comprises per combustion space at least one inlet valve, at least one outlet valve, a fuel injector and an ignition source which is preferably configured as a spark plug.

Figure 2:
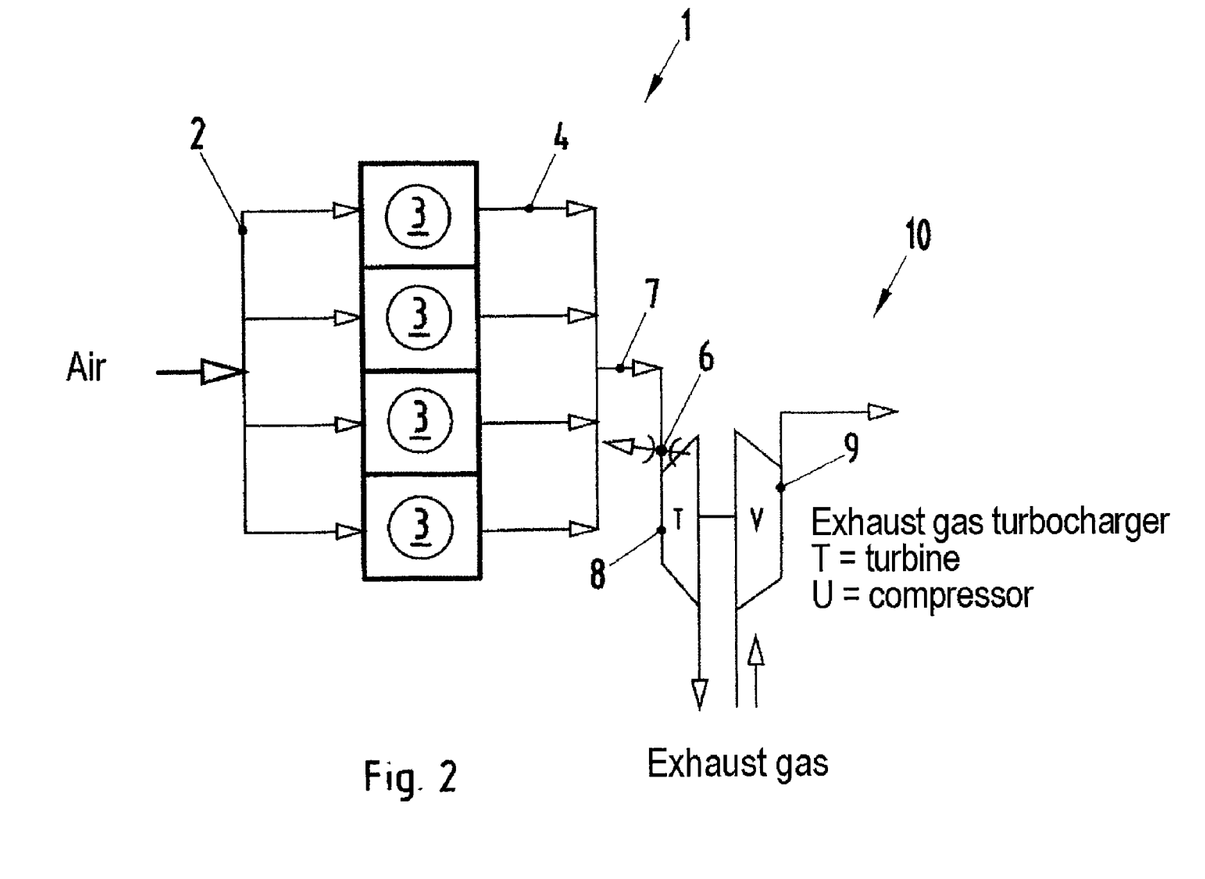
FIG. 2 shows a diagrammatic image of an internal combustion engine according to a second exemplary embodiment.

According to a first version of the invention, an exhaust-gas flap 6 is positioned, downstream of a catalytic converter 5, in the exhaust line 7 of the internal combustion engine 1. According to a second exemplary embodiment of the invention, the internal combustion engine 1 comprises an exhaust-gas turbocharger 10 which has a turbine 8 and a compressor 9. According to the second exemplary embodiment, the exhaust-gas flap 6 is positioned upstream of the inlet into the turbine 8. The internal combustion engine 1 according to aspects of the invention is operated with compression ignition or with spark ignition, depending on the load point. Particularly when the exhaust-gas turbocharger 10 is used, the positioning of the exhaust-gas flap 6 takes place upstream of the exhaust-gas turbine inlet. Consequently, a reliable setting of a uniform exhaust-gas back-pressure in the exhaust manifold of the internal combustion engine is obtained. Alternatively, the exhaust-gas back-pressure adjustment device is designed as an integral part of the exhaust-gas turbocharger 10, the setting of the exhaust-gas back-pressure possibly being carried out with the aid of a variable turbine geometry of the exhaust-gas turbocharger 10. The exhaust-gas flap 6 may therefore be dispensed with. The operation according to aspects of the invention of the internal combustion engine relates both to the first version and to the second version of the internal combustion engine 1 according to FIGS. 1 and 2.

Figure 3:
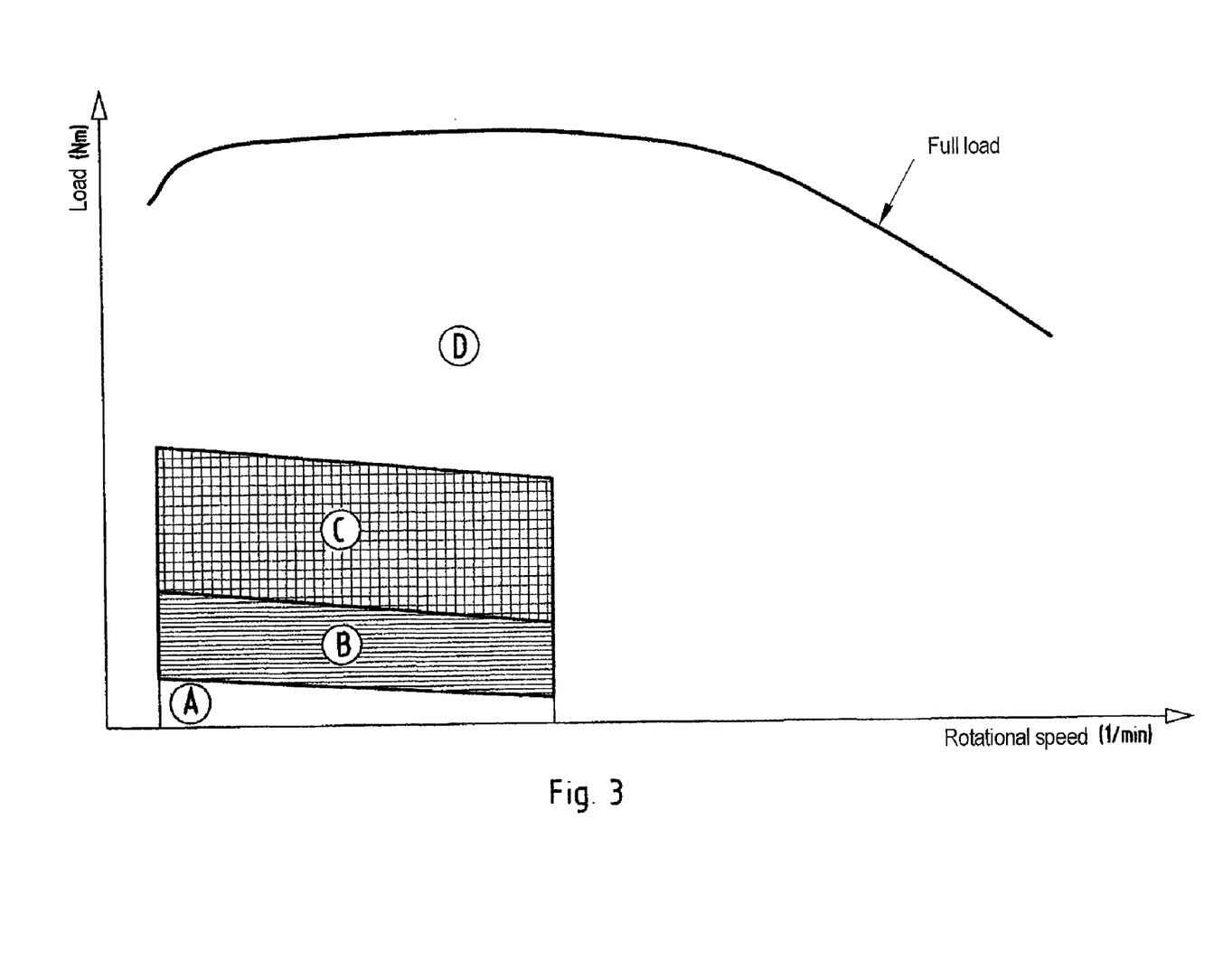
FIG. 3 shows a diagrammatic illustration of an engine characteristic map for an internal combustion engine according to FIG. 1 or FIG. 2.

FIG. 3 depicts different operating-point ranges of the internal combustion engine 1. In a low-load range according to characteristic map region A, the internal combustion engine 1 is operated with spark ignition. In a lower load range according to a characteristic map region B and in a lower medium load range according to a characteristic map region C, the internal combustion engine 1 is operated in a compression-ignition mode. By contrast, in an upper load range according to a characteristic map region D, the internal combustion engine 1 is operated with spark ignition.

Fresh air is sucked in by the air suction system 2 of the internal combustion engine 1 and is supplied to the respective combustion space. The exhaust gases formed after each combustion pass into the exhaust manifold 4 and thereafter arrive at the exhaust-gas catalytic converter 5, an exhaust-gas back-pressure being set within the exhaust manifold 4 by means of the exhaust-gas flap 6. The internal combustion engine 1 operates on the four-stroke principle, and in this case it can be operated as a function of the load point as a petrol engine, that is to say with spark ignition, or in a compression-ignition mode. In the compression-ignition mode, combustion is initiated by auto-ignition. In a four-stroke method, a stroke corresponds to one complete piston stroke. The operating cycle, consisting of four strokes, of the internal combustion engine 1 corresponds to a combustion cycle, a combustion cycle commencing with an intake phase at a charge-exchange top dead centre. During the intake phase, fresh air is supplied to the combustion space, an intake phase extending as far as a bottom dead centre. During the intake phase, fuel is injected into the combustion space by means of the fuel injector positioned in the combustion space. During the intake phase, the fuel is mixed with the sucked-in fresh air, so that a fuel/air mixture is formed. Subsequently, during a compression phase, the mixture formed is compressed, the compression phase extending as far as an ignition top dead centre ITDC. The mixture is ignited by auto-ignition or by an ignition spark, depending on the operating point of the internal combustion engine, and is burnt.

Figure 4:
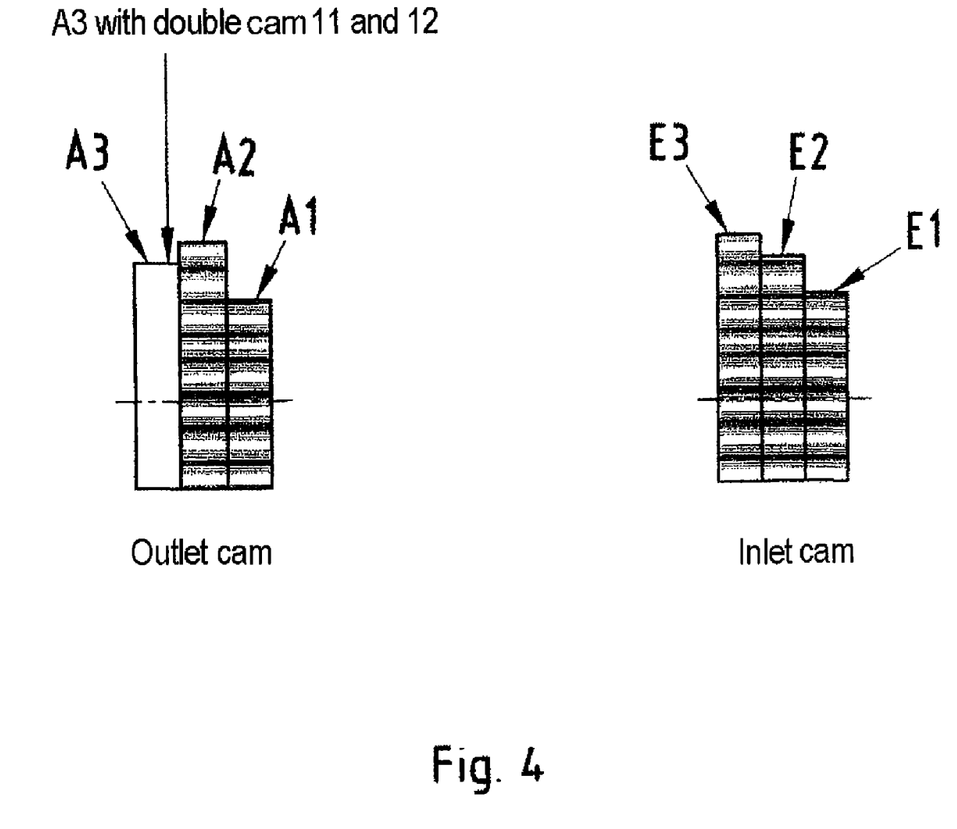
FIG. 4 shows a diagrammatic illustration of inlet cams and outlet cams of a sliding-cam device for an internal combustion engine according to FIG. 1 or FIG. 2.

For actuating the inlet valves, not illustrated, the internal combustion engine 1 according to aspects of the invention has a sliding-cam device, not illustrated, by means of which the actuation of the respective inlet valve takes place by means of a different inlet cam, depending on the operating point. For this purpose, according to FIG. 4, three inlet cams E1, E2 and E3 are provided, by means of which different valve lifts of the inlet valve can be set. Furthermore, for actuating the outlet valves, the internal combustion engine 1 likewise has a sliding-cam device, not illustrated, which has three different outlet cams A1, A2 and A3, the outlet valve being actuated by an outlet cam, depending on the load point. Different outlet-valve lifts can thereby be set. The actuation of the outlet-side and inlet-side sliding-cam devices may be carried out, for example, according to the publication EP 0 798 451 B1.

Figure 5:
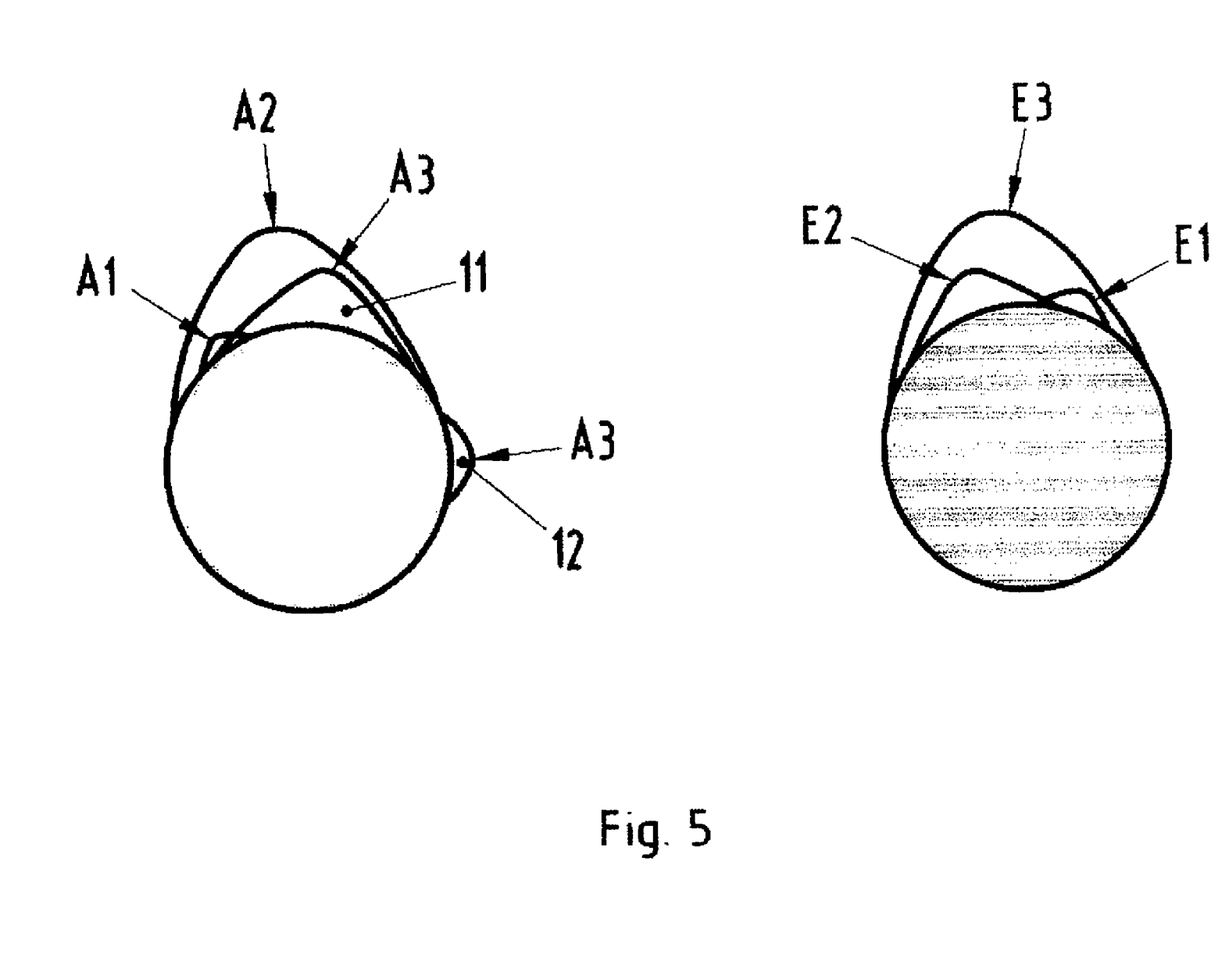
FIG. 5 shows a sectional view of the cam forms of the inlet and outlet valves from FIG. 4.
Figure 6:
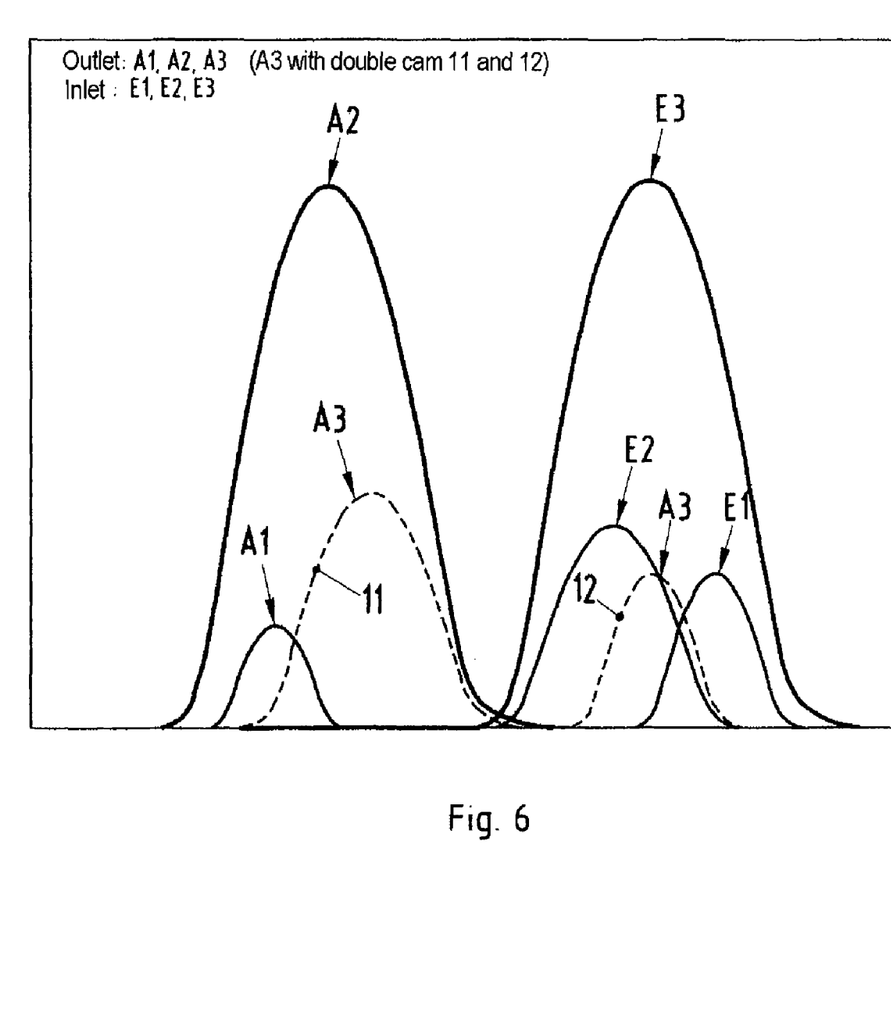
FIG. 6 shows a diagrammatic illustration of lift profiles of the inlet and outlet valves which are actuated by the inlet and outlet cams from FIG. 4.
Figure 7:
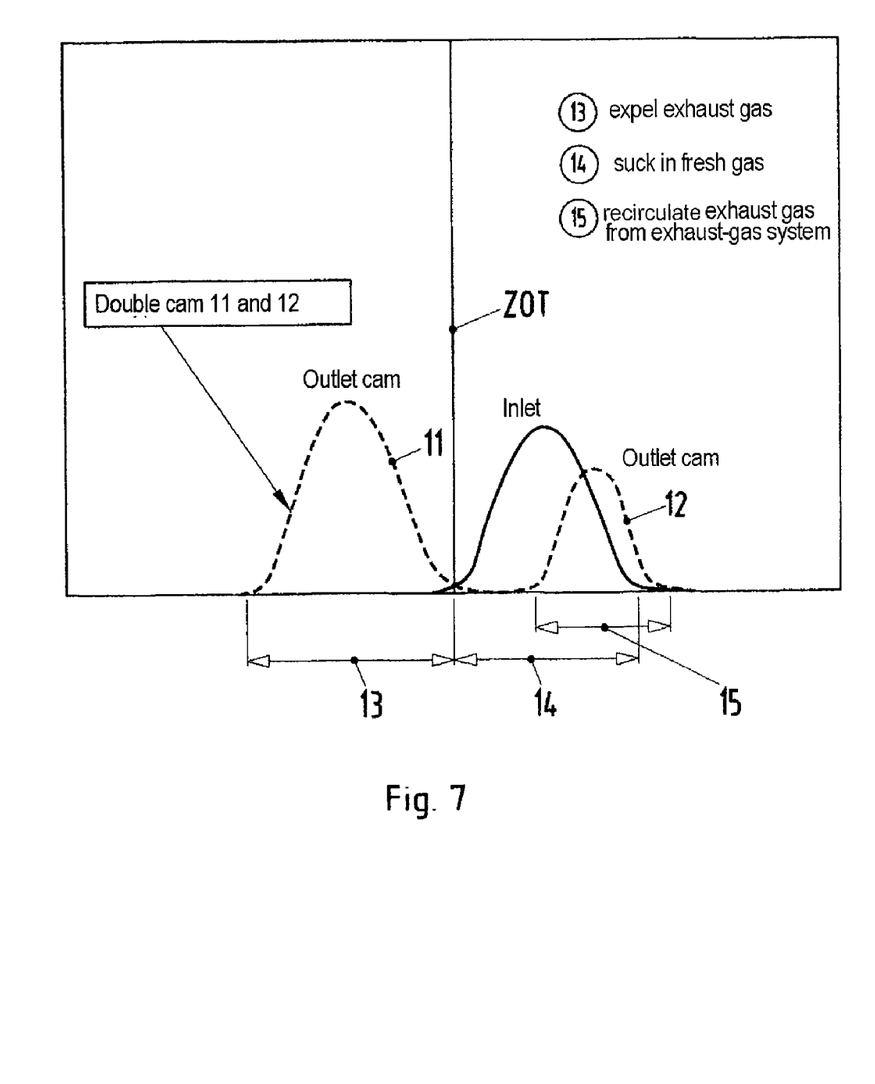
FIG. 7 shows a diagrammatic illustration of lift profiles of the inlet and outlet valves during exhaust-gas recirculation.
Figure 8:
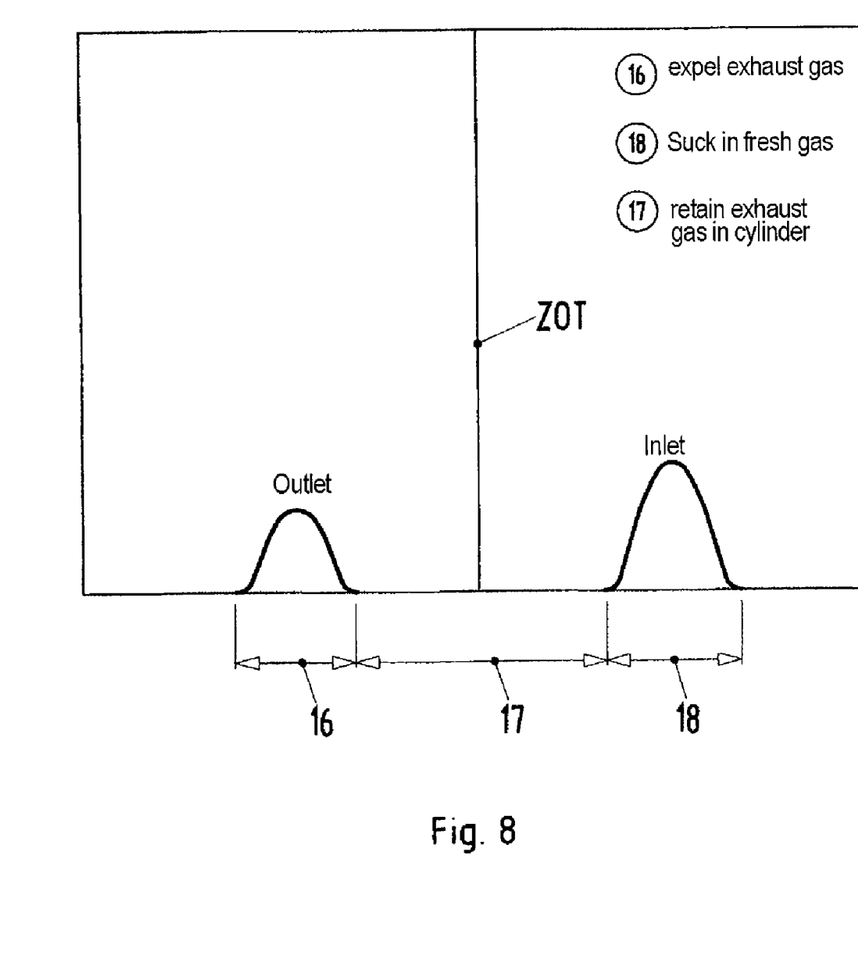
FIG. 8 shows a diagrammatic illustration of lift profiles of inlet and outlet valves during exhaust-gas retention.

According to FIG. 5, the outlet cam A3 has a first cam 11 and a second cam 12, by means of which two outlet opening phases according to FIGS. 6 and 7 come into effect when the outlet valve is actuated by the outlet cam A3. When the outlet valve is actuated by the outlet cam A3, the actuation of the outlet valve by the cam 11 takes place during the expulsion stroke and causes a first outlet opening phase 13, this being followed by a second outlet opening phase 15 by means of the cam 12, the second outlet opening phase 15 taking place or commencing during an inlet opening phase 14. As a result of the configuration of the double cam of the outlet cam A3, at a specific operating point of the internal combustion engine exhaust gas can be sucked out of the exhaust-manifold region back into the combustion space, since, during the outlet opening phase 15, a vacuum prevails in the combustion space, as compared with the exhaust-gas pressure prevailing in the exhaust manifold 4.

Figure 9:
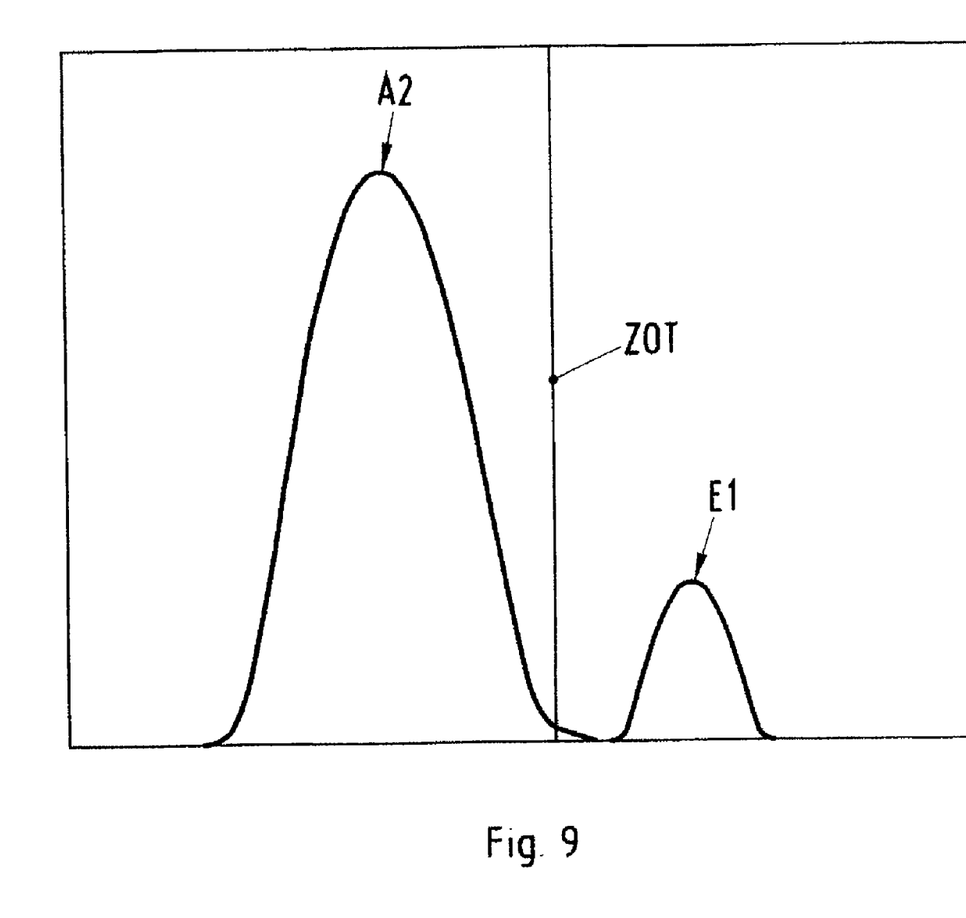
FIG. 9 shows an illustration of valve-lift profiles of inlet and outlet valves for an operating point in a low-load range.

FIG. 6 illustrates the valve-lift profiles which occur as a result of operation by means of the respective inlet cams or outlet cams. In a first characteristic map region A, the internal combustion engine 1 is operated with spark ignition, the sliding-cam device on the inlet side being set in such a way that the inlet valves are actuated by the cam E1. In this characteristic map region A, the outlet valves are actuated by the outlet cam A2. This gives rise on the outlet side and on the inlet side to the valve-lift profile illustrated in FIG. 9. Preferably, the internal combustion engine 1 is operated with the characteristic map region A in the case of low loads, for example during the idling of the internal combustion engine 1.

Figure 10:
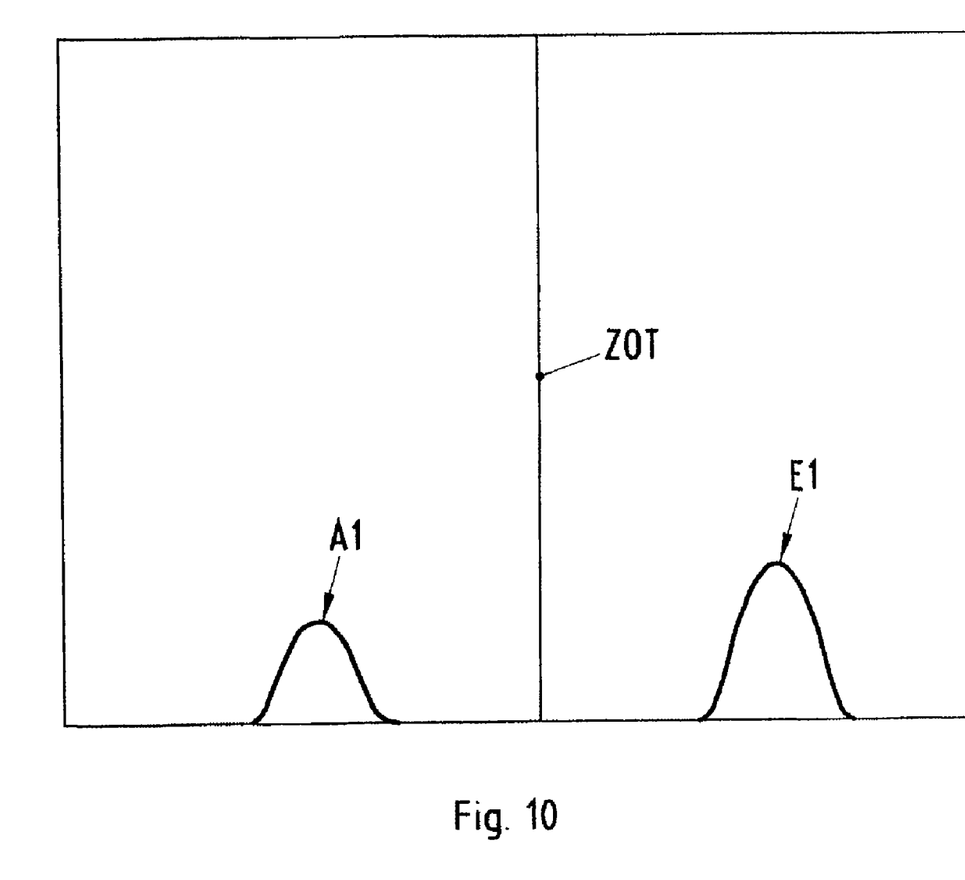
FIG. 10 shows an illustration of valve-lift profiles of inlet and outlet valves for an operating point in a lower load range.

Furthermore, according to FIG. 10, in a characteristic map region B the internal combustion engine is operated in a compression-ignition mode, here the sliding-cam device on the inlet side being actuated in such a way that the inlet valve is actuated by the inlet cam E1. The outlet valve is actuated by the outlet cam A1. Furthermore, the internal combustion engine according to aspects of the invention has a camshaft adjuster in each case both on the inlet side and on the outlet side, so that the control times of the inlet valves and of the outlet valves can be varied. In the characteristic map region B, for example, the control times 16 and 18 of the outlet valves and of the inlet valves are set in such a way that the closing time points of the outlet valves are early, so that a specific exhaust-gas quantity is retained in the combustion space. The opening time point of the inlet valve E1 is correspondingly later, so that the necessary exhaust-gas quantity is retained in the combustion space. Here, a valve interference 17 is set between the outlet valve and the inlet valve.

Figure 11:
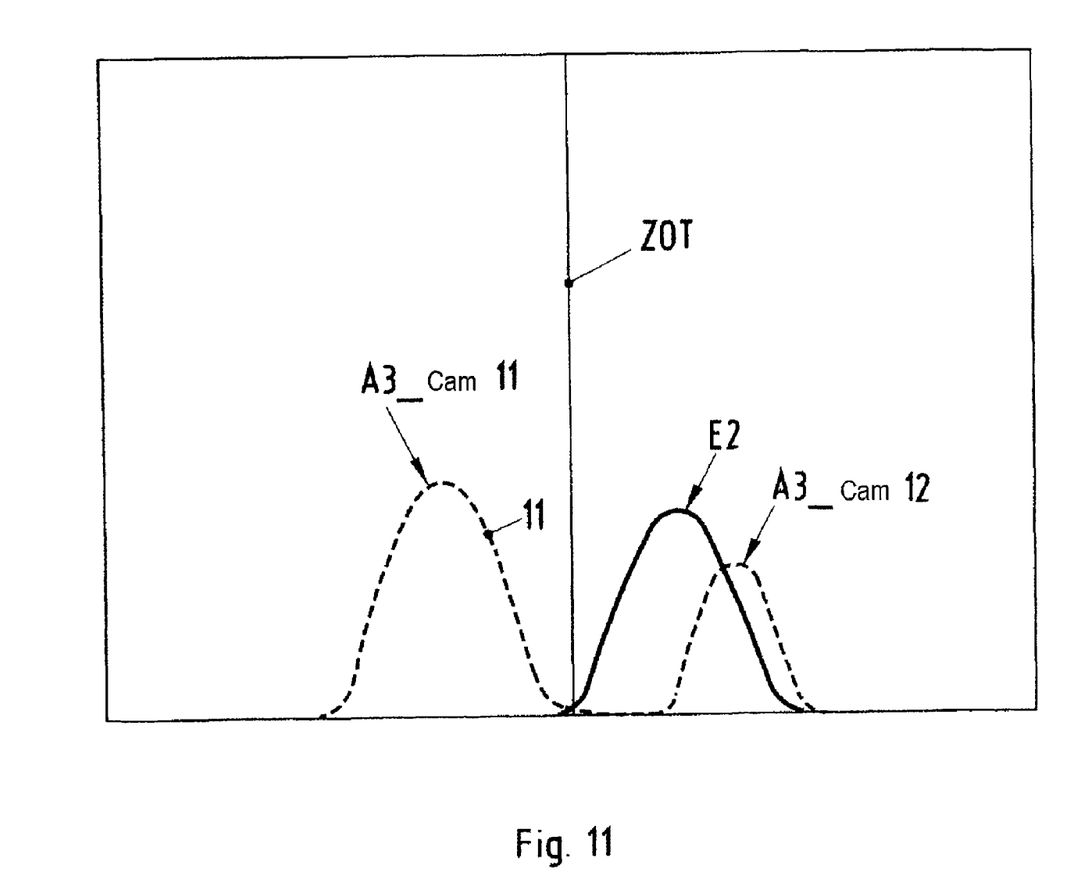
FIG. 11 shows an illustration of valve-lift profiles of inlet and outlet valves for an operating point in a lower medium load range.
Figure 12:
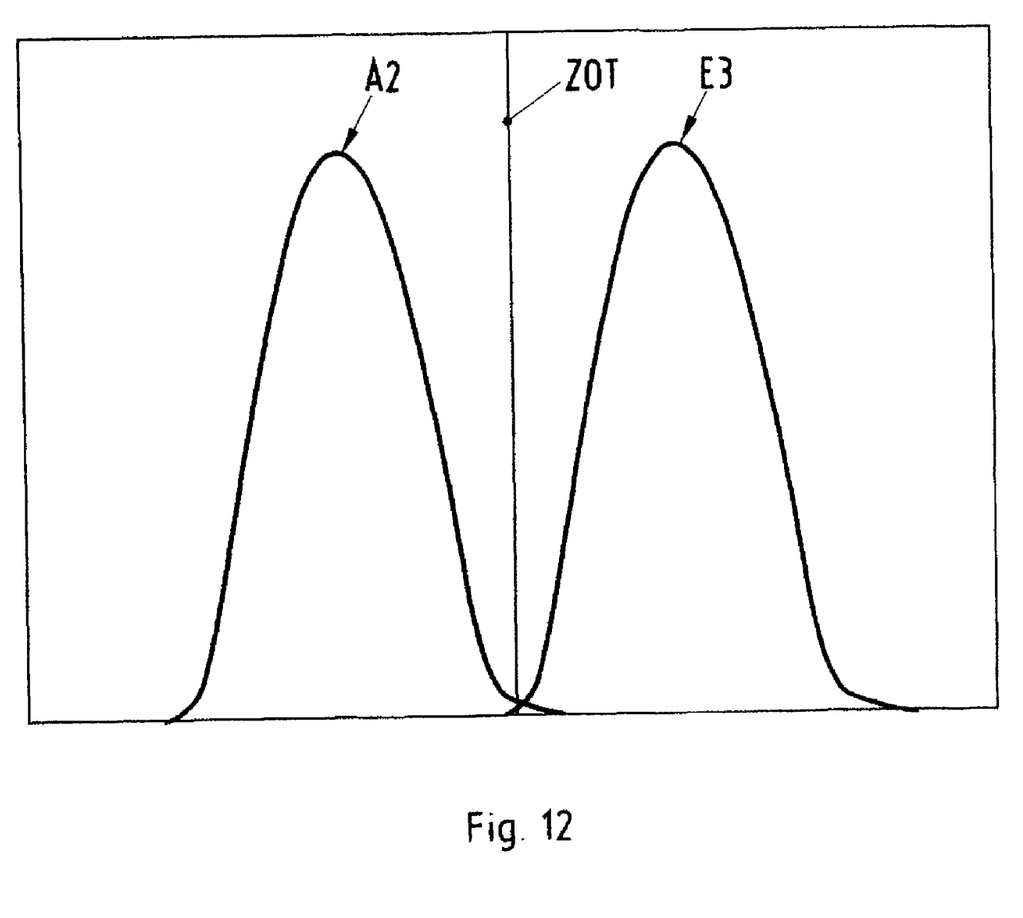
FIG. 12 shows an illustration of valve-lift profiles of inlet and outlet valves for an operating point in an upper load range.

FIG. 11 illustrates the operation of the internal combustion engine in the characteristic map region C, in which, on the inlet side, the inlet cam E2 for operating the inlet valves is set. To actuate the outlet valve, the outlet cam A3 is provided, which has the first cam 11 and the second cam 12. When corresponding control times are set by the camshaft adjusters on the inlet side and on the outlet side, no exhaust-gas retention takes place in this characteristic map region C. In order to set sufficient exhaust gas in the combustion space for compression ignition, in the characteristic map region C exhaust-gas is sucked out of the exhaust manifold 4 and comes into effect as a result of the second outlet opening phase 15. In the upper load range, the internal combustion engine 1 is operated with spark ignition according to characteristic map region D, according to FIG. 12 the cam E3 being provided on the inlet side and the cam A2 on the outlet side for operation in the characteristic map region D.

According to aspects of the present invention, the internal combustion engine 1 can be operated with petrol, in which case the internal combustion engine 1 can be operated as a supercharged petrol engine. The configuration according to aspects of the invention of the sliding-cam devices on the inlet side and on the outlet side makes it possible to operate the internal combustion engine 1 in the characteristic map regions B and C with auto-ignition by exhaust-gas retention and exhaust-gas recirculation, the internal combustion engine 1 temporarily being operated with spark ignition during a characteristic map changeover from the characteristic map region B to C, and vice versa. The internal combustion engine 1 is operated here on the inlet side by the inlet cam E2 and on the outlet side by the outlet cam A2. By the internal combustion engine 1 being configured according to the invention, the fuel consumption is optimized and the exhaust-gas emissions are minimized. The internal combustion engine 1 according to aspects of the invention makes it possible to extend petrol auto-ignition to a wide characteristic map range which has not been possible hitherto. By the internal combustion engine 1 being operated according to the invention, a reduction in fuel consumption and in exhaust-gas emissions is achieved, while, in particular, nitrogen oxide emissions during efficiency-optimized operation of the internal combustion engine are minimized.

The invention relates to an internal combustion engine 1 with a plurality of cylinders 3, which are each assigned at least one inlet valve, one outlet valve and a combustion space, with an inlet camshaft connected to a camshaft adjuster, with an outlet camshaft connected to a camshaft adjuster, with a switchable inlet-valve drive which has a plurality of inlet cams for actuating the respective inlet valve, with a switchable outlet-valve drive which has a plurality of outlet cams for actuating the respective outlet valve, and with an exhaust-gas system. The internal combustion engine 1 is operated with compression ignition or with spark ignition as a function of the operating point. For this purpose, a specific residual exhaust-gas quantity is set in the combustion space for compression ignition. Furthermore, the internal combustion engine is operated as a function of the operating point by means of an outlet cam, by means of which a first outlet opening phase and a second outlet opening phase take place, the second outlet opening phase commencing during an inlet opening phase. At a first operating point in a compression-ignition mode, the residual exhaust-gas quantity in the combustion space is dimensioned as a function of a valve interference set between the inlet and the outlet valve during a charge exchange, at a second operating point in the compression-ignition mode the residual exhaust-gas quantity in the combustion space being dimensioned as a function of a duration of the second outlet opening phase.

The invention claimed is:

1. Internal combustion engine comprising:
   a plurality of cylinders, which are each assigned at least one inlet valve, at least one outlet valve and a combustion space,
   at least one inlet camshaft and at least one outlet camshaft,
   a switchable inlet-valve drive for actuating the inlet valves,
   a switchable outlet-valve drive for actuating the outlet valves,
   an exhaust-gas system which is provided with an exhaust-gas back-pressure adjustment device for setting an exhaust-gas back-pressure as a function of an operating point,
   wherein the internal combustion engine is configured to operate with compression ignition or with spark ignition as a function of the operating point,
   wherein in a compression-ignition mode, a residual exhaust-gas quantity is capable of being set in the combustion space with the aid of the exhaust-gas back-pressure adjustment device,
   wherein the outlet-valve drive is configured in such a way that a plurality of cams are selectively provided for actuating a respective outlet valve,
   wherein at least one outlet cam includes a plurality of cam elevations for setting a plurality of outlet opening phases.

2. Internal combustion engine according to claim 1, wherein the outlet cam for setting a plurality of outlet opening phases is configured as a double cam.

3. Internal combustion engine according to claim 1, wherein the exhaust-gas back-pressure adjustment device is configured as an exhaust-gas flap and is positioned downstream of an exhaust-gas catalytic converter that is in the exhaust-gas system.

4. Internal combustion engine according to claim 1, wherein the exhaust-gas back-pressure adjustment device is positioned upstream of an inlet of an exhaust-gas turbine that is in the exhaust-gas system.

5. Internal combustion engine according to claim 1, wherein the exhaust-gas back-pressure adjustment device is configured as an integral part of an exhaust-gas turbocharger, wherein a setting of the exhaust-gas back-pressure takes place with the aid of a variable turbine geometry of an exhaust-gas turbocharger.

6. Internal combustion engine according to claim 1, wherein the outlet-valve drive is configured in such a way that a first outlet opening phase and a second outlet opening phase can be set, wherein the second outlet opening phase is capable of being set during an inlet opening phase.

7. Internal combustion engine according to claim 1, wherein the outlet-valve drive has a sliding-cam device.

8. Internal combustion engine according to claim 1, wherein the inlet-valve drive has a sliding-cam device.

9. Internal combustion engine according to claim 1, wherein the inlet camshaft and the outlet camshaft are connected in each case to a camshaft adjuster.

10. Method for operating an internal combustion engine according to claim 1, wherein the internal combustion engine is operated, in the compression-ignition mode, by means of an outlet cam, by means of which a first outlet opening phase and a second outlet opening phase take place, the second outlet opening phase commencing during an inlet opening phase, and, at a first operating point of the compression-ignition mode, the residual exhaust-gas quantity in the combustion space being dimensioned as a function of a valve interference set between the inlet and the outlet valve during a charge exchange, and, at a second operating point of the compression-ignition mode, the residual exhaust-gas quantity in the combustion space being dimensioned as a function of a duration of the second outlet opening phase.

11. Method according to claim 10, wherein the internal combustion engine is operated with spark ignition during a changeover from the first operating point to the second operating point, and vice versa.

12. Method according to claim 10, wherein the exhaust-gas system is provided with an exhaust-gas back-pressure adjustment device, by which the exhaust-gas back-pressure in an exhaust manifold of the exhaust-gas system is varied as a function of an operating point.

13. Method according to claim 10, wherein the residual exhaust-gas quantity in the combustion space is dimensioned as a function of a position of the exhaust-gas back-pressure adjustment device.

14. Method according to claim 10, wherein, at the second operating point of the compression-ignition mode, the inlet valves and the outlet valves are controlled in such a way that a specific exhaust-gas quantity is sucked out of the exhaust-gas system back into the combustion space.

15. Method according to claim 10, wherein the outlet-valve drive and the inlet-valve drive are configured in such a way that different valve lifts and/or different control times are set in each case as a function of an operating point on the outlet side and on the inlet side.

* * * * *